Dec. 5, 1939.　　　B. G. BLONKVIST　　　2,182,275
COMBINATION REAR VISION MIRROR AND SIGN
Filed April 24, 1939　　　2 Sheets-Sheet 1

Inventor
BRENT G. BLONKVIST,

By Clarence A. O'Brien
and Hyman Berman
Attorneys

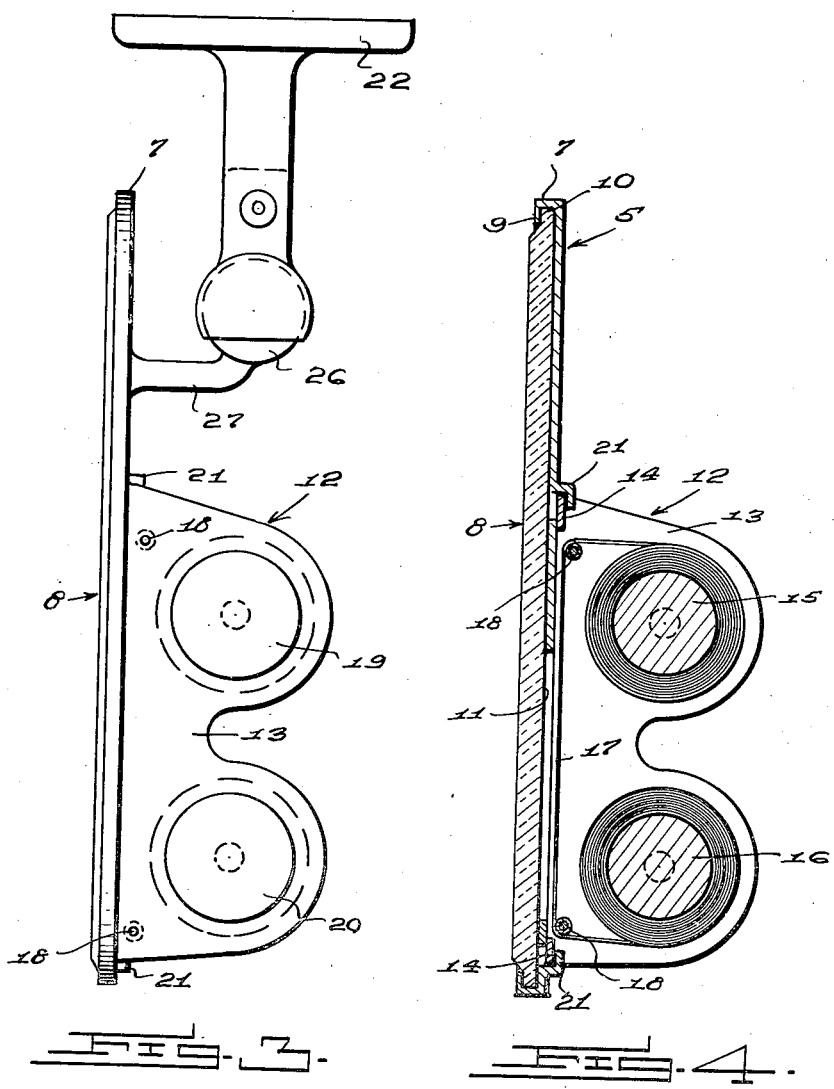

Patented Dec. 5, 1939

2,182,275

UNITED STATES PATENT OFFICE 2,182,275

COMBINATION REAR VISION MIRROR AND SIGN

Brent G. Blonkvist, Pampa, Tex.

Application April 24, 1939, Serial No. 269,760

4 Claims. (Cl. 40—86)

This invention has reference broadly to rear vision mirrors for vehicles, and more particularly to a rear vision mirror equipped so as to serve and function, in addition to its usual function, as a sign holder for holding and displaying to view signs in the form of safety slogans of the type now generally distributed by insurance companies to the owners and operators of vehicles, with the intention that such slogan-signs be always displayed to the operator of such vehicle.

The invention together with its objects and advantages will be best understood from a study of the following description taken in connection with the accompanying drawings wherein:

Figure 3 is an end elevational view, and

Figure 4 is a vertical sectional view taken substantially on the line 4—4 of Figure 2.

Figure 1:
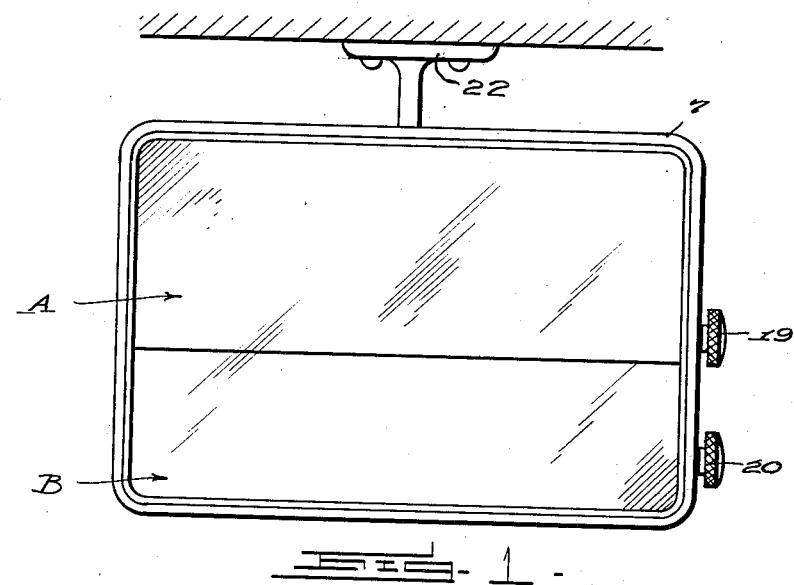
Figure 1 is a front elevational view of a combination rear vision mirror and sign holder embodying the features of the present invention.
Figure 2:
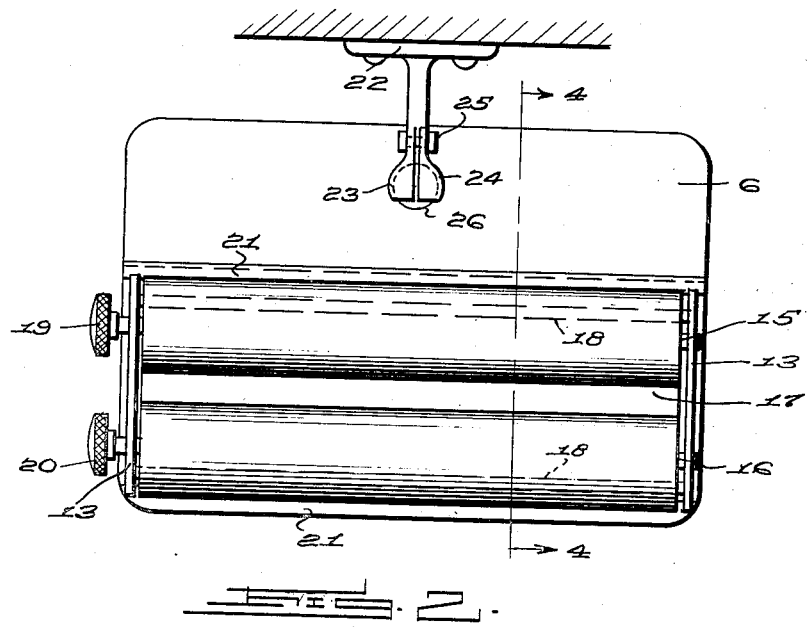
Figure 2 is a rear elevational view thereof.

Referring more in detail to the drawings it will be seen that in the preferred embodiment thereof the combination rear vision mirror and sign holder comprises a frame 5 that is in the form of a metallic plate 6 having a marginal rim 7 that accommodates within the confines thereof a panel of glass 8.

The rim 7 of the frame is provided with an internal groove or channel 9 which receives the rabbeted or reduced edge 10 of the glass panel to the end that said panel is rigidly mounted within said frame.

The upper section A of the glass panel 8 is treated so as to function as a mirror while the lower and smaller section B of said panel is in the form of clear glass to function as a sight window.

Opposite the section B of the panel 8 the plate 6 of the frame 5 has a portion thereof removed to provide therein a relatively large opening 11 as best shown in Fig. 4.

Further in accordance with the present invention there is provided a sign holder 12 which is in the form of a pair of opposed plates 13 connected together by upper and lower bars 14.

The plates 13 accommodate therebetween upper and lower spools 15 and 16 upon which is windable a web 17.

The web 17 is divided off into panels, each panel bearing some form of indicium, such as a safety slogan or the like to be successively and selectively brought into position opposite the opening 11 to be viewed through the sight window B.

For the web 17 there are provided upper and lower guide rods 18 over which the web is trained as shown in Fig. 4, so as to hold the web in proper position.

For the rollers 15 and 16 there are provided easily accessible actuating knobs 19 and 20 respectively.

In the present embodiment of the invention the plate 6 of the frame above and below the opening 11 has struck out therefrom guide channels 21 with which are slidably engaged the bars 14 of the sign holder 12, whereby a quick detachable connection is provided between the frame 5 and the sign holder 12.

For mounting the combination rear vision mirror and sign holder in the automobile there is provided a more or less conventional rear vision suspension bracket 22 that embodies among other parts a socket consisting of a fixed section 23 and a removable section 24. Sections 23 and 24 of the socket are secured together through the medium of bolt and nut means 25, and the socket formed of said sections 23, 24 is adapted to accommodate a ball 26 provided on the end of an arm 27 that projects from the plate 6 of the frame 5.

Thus it will be seen that the ball and socket connection provides for adjustment of the combination mirror and sign holder as may be found desirable to the operator of the vehicle.

From the above it will be appreciated that the device is mounted substantially in the usual manner as any rear vision mirror is mounted within an automobile, and that when so mounted the same will function admirably as a rear vision mirror, and in addition thereto, as a medium for presenting to the driver of the vehicle a desired safety slogan.

The slogans may be changed from time to time; all that is required for effecting such change being the rotating of the selected one of the spools 15, 16 so that the web 17 will wind thereon as it pays out from the other spool, an intermediate portion of the web 17 passing rearwardly of the sight opening 11 for the purpose of bringing a selected section of the web into position opposite the opening so that the indicia thereon may be readily viewed through the section B of the panel 8.

It is thought that a clear understanding of the construction, utility and advantages of an invention of this character will be had without a more detailed description.

Having thus described the invention what is claimed as new is:

1. In a combination rear vision mirror and sign holder, a frame embodying a body plate and a marginal rim provided with an internal channel, a glass panel mounted in said frame and having the marginal edge portion engaging in said channel, said glass having a mirror section and a clear vision section, and said body plate having an opening therein disposed opposite to the clear vision section of said glass, a sign holder mounted on said body plate and including a pair of upper and lower rollers, an indicia-bearing web windable on said rollers and movable across said opening to be viewed through the clear vision section of said glass, and guide rods positioned above and below said opening and over which said web is trained to be guided thereby in its movement across said opening.

2. In a combination rear vision mirror and sign holder, a frame embodying a body plate having a marginal rim provided with an internal channel, a glass panel mounted within said frame and having its marginal edge fitting within said channel, said glass having a mirror section and a rear vision section, said body plate being provided with an opening opposite the clear vision section of said panel, and also being provided above and below said opening with channel guides, a sign holder embodying a pair of opposed plates and upper and lower bars connecting said plates, said upper and lower bars having slidable engagement with said guide channels for detachably supporting said sign holder on said body plate, upper and lower rollers journaled between said side plates, an indicia-bearing web having the ends thereof connected with said rollers to be wound thereon, and guide rods for said web mounted between said side plates and over which said web is trained to be guided thereby in its movement from one roller to another and across the opening in said body plate.

3. In a combination rear vision mirror and sign holder, a frame embodying a body plate having a marginal rim provided with an internal channel, a glass panel mounted within said frame and having its marginal edge fitting within said channel, said glass having a mirror section and a rear vision section, said body plate being provided with an opening opposite the clear vision section of said panel, and also being provided above and below said opening with channel guides, a sign holder embodying a pair of opposed plates and upper and lower bars connecting said plates, said upper and lower bars having slidable engagement with said guide channels for detachably supporting said sign holder on said body plate, upper and lower rollers journaled between said side plates, an indicia-bearing web having the ends thereof connected with said rollers to be wound thereon, and guide rods for said web mounted between said side plates and over which said web is trained to be guided thereby in its movement from one roller to another and across the opening in said body plate, and a suspension bracket for said combination rear vision mirror and sign holder, said bracket embodying a part adapted to be mounted on a support and a second part mounted on the said body plate, the first-named part of said bracket being provided with a socket, and the second-named part of said bracket being provided with a ball fitting within said socket and cooperating with the latter to provide a universal connection between the said parts of said bracket.

4. In a combination rear vision mirror and sign holder, a substantially rectangular shaped frame having a flange at its edge portion and an opening in its lower portion, a glass panel mounted in said frame and having its peripheral portion held in the flanged portion of the frame, said panel having an upper mirror section and a lower clear vision section, the latter section being located over the opening in the frame and indicia bearing means at the rear of the frame and extending over the opening therein, whereby said means are visible through the clear vision section of the panel and the opening in the frame.

BRENT G. BLONKVIST.